United States Patent [19]
Alling

[11] 3,788,715
[45] Jan. 29, 1974

[54] BEARING ADAPTER
[75] Inventor: Richard L. Alling, Torrington, Conn.
[73] Assignee: The Torrington Company, Torrington, Conn.
[22] Filed: Dec. 29, 1972
[21] Appl. No.: 319,517

[52] U.S. Cl. .............................................. 308/217
[51] Int. Cl. ............................................ F16c 33/46
[58] Field of Search ............................ 308/217, 235

[56] References Cited
UNITED STATES PATENTS
555,655  3/1896  Mossberg ........................... 308/235
1,324,769  12/1919  Arnold ................................ 308/235
2,117,633  5/1938  Smith ................................. 308/235

Primary Examiner—Charles J. Myhre
Assistant Examiner—Frank Susko
Attorney, Agent, or Firm—Frank S. Troidl

[57] ABSTRACT

An adapter is disclosed for changing the effective inside diameter or effective outside diameter of a bearing cage.

7 Claims, 7 Drawing Figures

PATENTED JAN 29 1974   3,788,715

BEARING ADAPTER

This invention relates to bearing cages. More particularly, this invention is an adapter for changing the effective inside diameter or effective outside diameter of a standard bearing cage.

There are definite advantages to being able to provide the market with standard bearings for several different purposes. However, a customer may need a bearing for use with a shaft or a bearing having an outside diameter which is different from the usual-type shaft or outside diamter, thereby requiring a bearing which is different from the standard bearing supplied by the supplier. When the customer wants such a bearing but wants the bearing to contain standard rollers, needles, or balls, the supplier must add additional flanges or in some other manner change the effective diameter of the bearing. Examples are shown in FIG. 6 and FIG. 7 of the U.S. Pat. to R. Jahn No. 3,240,542, granted Mar. 15, 1966.

My new bearing adapter can be connected to a conventional bearing cage having the conventional rollers, needles, or balls. It provides great flexibility in furnishing standard bearings adapted to a wide range of outside diameters as well as a wide range of bore diameters.

Briefly described, my new invention comprises at least one adapter for use with an annular bearing cage. The adapter changes the effective diameter of one of the perimeters of the cage. The adapter has a surface which is shaped to conform with the perimeter.

The invention, as well as its many advantages, may be further understood by reference to the following detailed description and drawings, in which.

Figure 1:
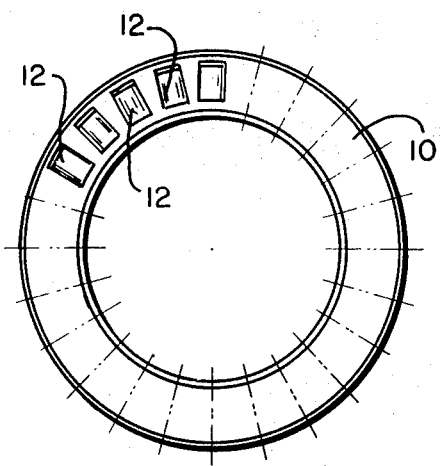
FIG. 1 is a plan view of a standard roller bearing.
Figure 2:
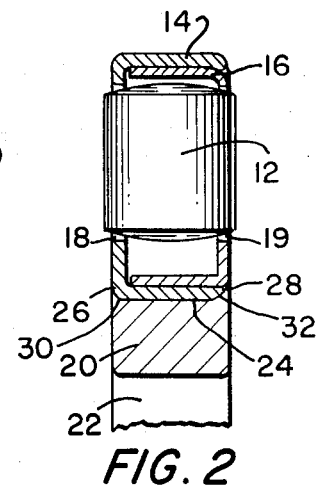
FIG. 2 is a sectional view, on an enlarged scale, illustrating my adapter for decreasing the effective inside diameter.

Referring to FIG. 1, a standard roller bearing may include an annular cage 10, in which a plurality of rollers 12 are positioned. As shown in FIG. 2, the cage may include an outer member 14 having a C-shaped cross-section, in which is positioned a second member 16 having a C-shaped cross-section. The cage parts 14 and 16 fit snugly together and are provided with pockets 18 and 19, respectively, adapted to retain and guide the rollers.

The effective inside diameter of conventional bearing 10 is decreased by the use of an annular adapter 20. The bore 22 of the adapter is dimensioned to fit around a shaft or other member of a predetermined diameter. The outer portion 24 of the cage part 14 has rounded or chamfered shoulders 26 and 28 at each longitudinal end. The adapter is provided with rim flanges 30 and 32 adapted to engage rounded or chamfered shoulders 26 and 28, respectively, thereby preventing axial movement of the cage with respect to the adapter.

Figure 3:
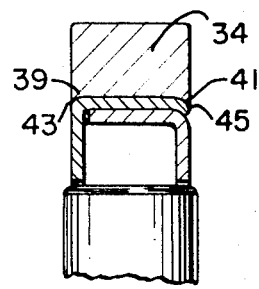
FIG. 3 is a sectional view showing an adapter for increasing the effective outside diameter.

An adapter for increasing the effective outside diameter of the cage is shown in FIG. 3. The adapter 34 includes shoulder 39 and 41 which engage rounded or chamfered shoulders 43 and 45, respectively, of the cage to prevent axial movement of the cage with respect to the adapter 34.

Figure 4:
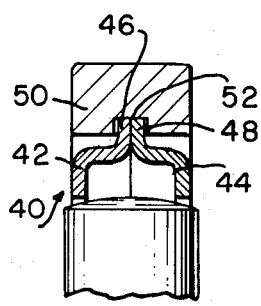
FIG. 4 is a view similar to FIG. 3, illustrating an adapter for use with a different type of bearing cage.

A slightly different cage structure is shown in FIG. 4. The cage 40 includes a pair of cage parts 42 and 44 whcih engage one another at their outer extremities through protrusion 46 on cage part 42 and protrusion 48 on cage part 44. The adapter 50 has an annular groove 52 on its inside at approximately its longitudinal center. The protrusions fit into the annular groove thereby preventing axial movement of the cage with respect to the adapter.

Figure 5:
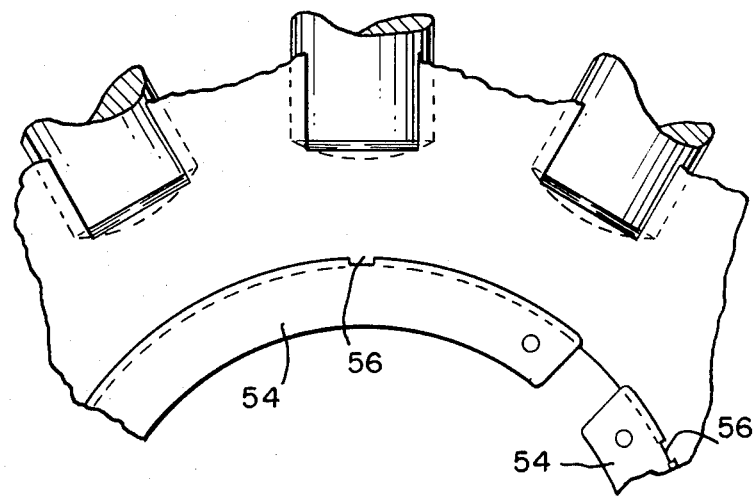
FIG. 5 is a partial plan view illustrating the use of a plurality of adapter sectors for decreasing the effective inside diameter.

As shown in FIG. 5, the adapting means may consist of a plurality of spaced-apart annular sectors 54. If desired, the sectors can be firmly staked to the cage by stakes 56, located on the annular sectors. This prevents relative circumferential movement of the adapters with respect to the cage.

Figure 6:
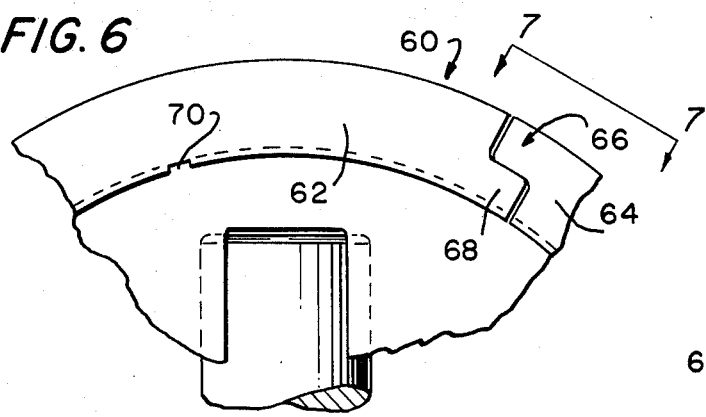
FIG. 6 is a partial plan view illustrating a further embodiment for increasing the outside diameter.
Figure 7:
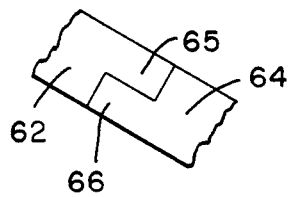
FIG. 7 is a view taken along line 7—7 of FIG. 6.

In FIG. 6, and FIG. 7, an adapter 60 for changing the effective outside diameter of a standard bearing includes adapter sectors 62 and 64 which abut one another. A portion 66 on sector 64 overlaps portion 68 on sector 62 and portion 65 on sector 62 overlaps an end portion of sector 64. A stake 70 may be provided on each sector to engage the cage and thereby prevent relative circumferential movement of the cage with respect to the adapter.

I claim:

1. In combination: an annular bearing cage having pockets formed therein; rollers retained within the pockets, said cage being adapted to engage the inside surface and the outside surface of the rollers; and an annular adapter for changing the effective diameter of one of the perimeters of the cage, said adapter having a surface shaped to snugly fit said perimeter.

2. The combination of claim 1 wherein: the annular adapter comprises a plurality of annular adapter segments.

3. The combination of claim 1 wherein: the outside surface of the adapter snugly fits the inside perimeter of the cage.

4. The combination of claim 1 wherein: the inside surface of the adapter snugly fits the outside perimeter of the cage.

5. The combination of claim 1 wherein: the adapter is firmly connected to the cage to prevent circumferential movement of the cage with respect to the adapter.

6. The combination of claim 4 wherein: the annular adapter has a longitudinally-centered annular groove on its inside, and the cage has an annular protruding portion which fits into the annular groove, thereby preventing axial movement of the cage with respect to the adapter.

7. The combination of claim 1 wherein said cage perimeter includes a rounded portion at each longitudinal end and the adapter is provided with rounded shoulders adapted to engage said rounded portions of the cage perimeter thereby preventing axial movement of the cage with respect to the adapter.

* * * * *